(12) United States Patent
Eriksson et al.

(10) Patent No.: US 7,474,649 B2
(45) Date of Patent: Jan. 6, 2009

(54) SCHEDULING IN PACKET SWITCHED NETWORKS

(75) Inventors: Ann-Christine Eriksson, Sundbyborg (SE); Peter Werner, Linköping (SE); Heinz Robert Eriksson, Vikingstad (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 621 days.

(21) Appl. No.: 10/506,846

(22) PCT Filed: Mar. 5, 2002

(86) PCT No.: PCT/SE02/00389

§ 371 (c)(1),
(2), (4) Date: Mar. 23, 2005

(87) PCT Pub. No.: WO03/075600

PCT Pub. Date: Sep. 12, 2003

(65) Prior Publication Data

US 2005/0180427 A1    Aug. 18, 2005

(51) Int. Cl.
*H04B 7/212* (2006.01)

(52) U.S. Cl. .................. 370/347; 370/395.42; 455/450; 455/452.2

(58) Field of Classification Search .............. 370/395.4, 370/321, 322, 337, 347, 395.41, 395.42, 370/229; 455/450, 452.2, 452
See application file for complete search history.

(56) References Cited

U.S. PATENT DOCUMENTS

| 6,748,220 | B1* | 6/2004 | Chow et al. .................. 455/450 |
| 2002/0041566 | A1* | 4/2002 | Yang et al. .................. 370/229 |
| 2002/0044527 | A1* | 4/2002 | Jiang et al. .................. 370/229 |
| 2002/0150115 | A1* | 10/2002 | Onvural et al. .............. 370/411 |
| 2003/0081635 | A1* | 5/2003 | Ando et al. .................. 370/528 |
| 2003/0198207 | A1* | 10/2003 | Lee et al. ..................... 370/337 |

FOREIGN PATENT DOCUMENTS

| EP | 0545533 A2 | 6/1993 |
| WO | WO 0135278 A1 | 5/2001 |
| WO | WO 0152588 A1 | 7/2001 |
| WO | WO 0209358 A2 | 1/2002 |
| WO | WO 0219744 | 3/2002 |
| WO | WO 0219744 A2 | 3/2002 |

* cited by examiner

*Primary Examiner*—Hassan Kizou
*Assistant Examiner*—Jeffrey M Rutkowski

(57) ABSTRACT

A system and method of scheduling radio resources for a plurality of users in a packet-switched radio communication network. A scheduling number (Si) is calculated for each user before each scheduling event. A weight (Wi) is assigned to each user based on an associated Quality of Service. The Si varies depending on the assigned Wi and when the user entered the scheduling session. Radio resources are assigned to the user having the largest ratio Wi/Si between the weight and the scheduling number.

8 Claims, 3 Drawing Sheets

SCHEDULING IN PACKET SWITCHED NETWORKS

TECHNICAL FIELD

The invention relates to scheduling of time slots on the radio interface to different users in a packet switched telecommunication network.

BACKGROUND

A Time Division Multiple Access, TDMA, radio communication system divides the time space in time slots on a particular transmitting frequency. The time slots are grouped together in TDMA-frames and each user gets one time slot. This means that there are as many users as there are time slots in each frame and sharing the same radio frequency. That is the case at least in principle, but some time slots or channels are normally reserved for control information.

When a time slot is assigned to a user in the way described the connection is regarded as circuit switched and the user owns the time slot as long as he needs the connection. Circuit switched connections are suitable for connections where there is a continuously ongoing flow of information over the channel, like voice communication, which is also sensitive to delay. On the other hand when the traffic is data which has a bursty character and which is not that delay sensitive, the user does not need the channel all the time. He only needs it when there actually is a data packet to send or receive. In the mean time the channel could be used by others. This is the background to packet switched connections where several users may share the same channel.

The universal TDMA-system GSM was originally designed for circuit switched connections but by adding some extra nodes, this existing system may also be used for packet switched connections, the GPRS-solution (General Packet Radio System).

In packet switched solutions, each user gets one or several time slots reserved for his disposal. Other users may, however, use the same time slots and there is a need for scheduling the time slots on the different users, especially when they request service at the same time. Depending of type of data, and need for speed requested among the users, different classes of Quality of Service, QoS, are defined. The QoS for a certain data packet also has an impact on the scheduling and users with high class QoS will be favoured in relation to those having lower classes. Thus depending on several parameters the scheduling could become quite complicated.

Current available scheduling methods for GPRS are "Weighted Round Robin" and "Virtual Clock Multiplexing". Reference could also be made to the following literature:
- WO 2001/525 88 assigned to Quallcomm Inc. publ Jul. 19, 2001.
- Resource Allocation in GPRS Wireless Network, Tripathi et al, Personal Wireless Communications, 2000 IEEE International Conference, 2000, p. 388-394.
- Scheduling and QoS in GPRS, Sau et al, Universal Personal Communications 1998, Vol 2 p. 1067-1071.
- An Air Interface Solution for Multi-rate General Packet Radio Service, Taaghol et al Vehicular Technology Conference 1997, vol. 2, p. 1263-1267.

SUMMARY OF THE INVENTION

The scheduling must be able to distribute the radio resources momentarily between the users according to their weights as far as the reservation situation allows and as soon as they request service. The alteration between users must be as finely grained as possible. When a new user requests service or when another ceases his request, the system must react accordingly without delay. When there is an unbalance of the reservation distribution, the scheduler must still make full use of each timeslot and a problem with existing prior art solutions is that such efficient use of schedulers cannot be done without favouring or disfavouring certain users.

It is thus an object of this invention to overcome the problems of unbalance of scheduling, particularly when the user pattern changes, and that scheduling of channels between users still is performed without favouring or disfavouring any users.

Another object is that the scheduling is performed efficiently and without loosing any time slots.

Still another object is to, without loosing efficiency, keep the balance independent of the number of users, but dependant on the weights associated with each user and the number of available channels.

These and other objects are achieved by calculating, as soon as there are channels available for scheduling, a scheduling number for each user, i.e. a number defining a certain user's position in a queue for upcoming available channels. For the number account is taken for earlier schedulings, the weight, the number of users, the time slots assigned to the group and the dynamic behaviour of the users. The user pattern may change during the scheduling sessions. New users enter the scene, while others leave. The QoS may also change during a user's session. In an ideal hypothetical situation a new user coming in at the same time as another one leaves having the same QoS and other parameters, the new user replaces the old one without affecting the queue for the remaining users.

The invention is further defined in the appended claims relating to methods, systems and network elements, wholly or partly incorporated in the systems, for the purpose of scheduling radio resources in a packet switched telecommunication entity.

FIGURES

PREFERRED EMBODIMENTS

Figure 1:
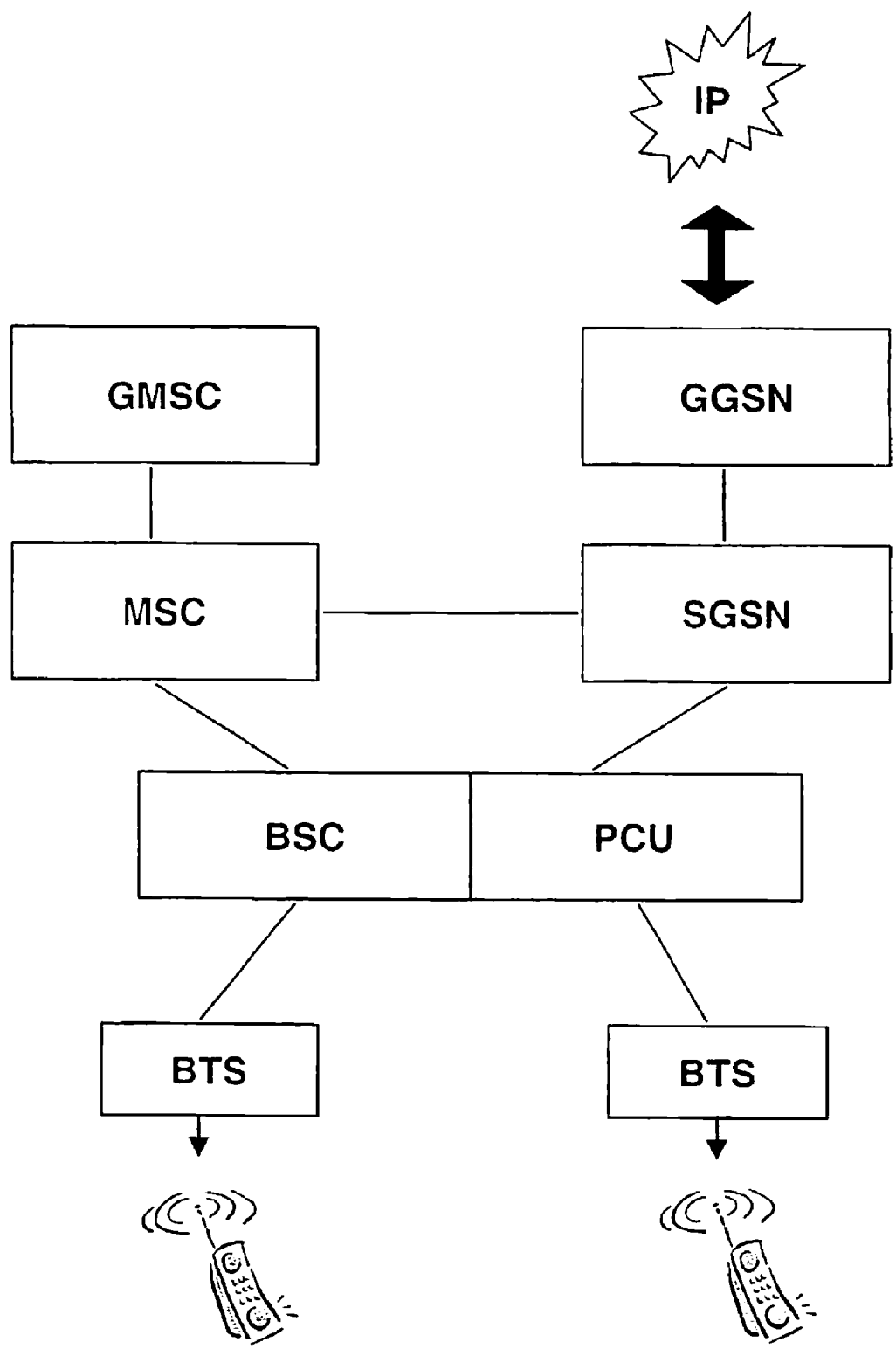
FIG. 1 is a general overview of a GPRS-network.

FIG. 1 shows a general overview of a GPRS-system integrated in a conventional GSM-network with its Mobile Switching Centre, MSC, Gateway, GMSC, and Base Station Controller, BSC. The added nodes for GPRS are the Serving GPRS Support Node, SGSN, and the Gateway, GGSN, communicating with an IP-network for example. A Packet Control Unit, PCU, is added to the BSC. The described components are connected to Base Station Transceivers, BTS, which communicate with Mobile Stations over a radio interface.

When a user has data information to transport a Temporary Block Flow, TBF, is established for him. The TBF is divided into a number of radio blocks each consisting of four bursts on a particular channel in four consecutive TDMA-frames. A PSET is defined as a number of packet data channels, PDCH, in the TDMA-frame assigned to the users of packet switching on a radio frequency, while the rest of the time slots in the frame are used for circuit switched traffic and control information. Each user gets a reservation on the PSET. The PCU in the BSC controls the packet data flow. The Medium Access Control (MAC)-protocol multiplexes the concurrent TBFs onto the radio interface. Every 20 milliseconds, the approximate duration for a radio block to be sent, a new scheduling decision has to be made for the PSET. Each TBF has an associated weight related to the QoS for the priority of traffic handling. In an ideal situation, the schedulings a certain TBF receives is proportional to its weight divided by the sum of weights.

The PSET is not necessarily limited to a fixed number of channels on the carrier frequency, but could vary during the session and include different time slots. For simplicity reasons, however, this description is further on limited to a fixed PSET.

A scheduling session starts when at least one user requests packet switched service on the PSET and ends when all users participating in the session have sent their last packet.

According to the invention a new scheduling number is calculated for each user whenever the system is ready to send a new radio block. The number depends on the QoS weight but is independent of the structure of the PSET and the particular time slots allocated to each user. Account is also taken for changes in user pattern. The invention aims to give a new user a place in the scheduling queue which place he would have had if he had been there from the start. In this description "virtual" scheduling number is used. "Virtual" means that the number may differ from the real number for calculation reason. For example a starting value for the number differing from zero must be used according to a suggested algorithm below.

Some definitions:

A scheduling round represents the set of schedulings made on the whole PSET, i.e. all the packet channels in the TDMA-frame.

A scheduling step is the scheduling of a single radio block.

i is the number of the user.

TBFi: Temporary block flow for user i.

$W_i$: Weight of $TBF_i$.

$S_i$: Accumulated number of "virtual" schedulings for $TBF_i$. After a scheduling step the S-value is increased by 1.

$\Sigma S_i$: Total number schedulings numbers for all TBFs having reservation on the PSET for the moment.

The r-ratio: $r_i = W_i/S_i$. This ratio is decisive of which TBF to be scheduled next time.

$S_1 = \max\{W_i \Sigma S_i/((\Sigma W_i)-W_i); 1\}$: $S_1$ is the startvalue for the virtual scheduling number. When the session starts, all the $S_1$-values for participating TBFs are set to 1. When new users enters, its $S_1$-value is a function of all earlier S-values and weights, a function normally greater than 1.

A first example of a scheduling scheme is explained by reference to FIGS. 2A and B and some tables below.

Figure 2A:
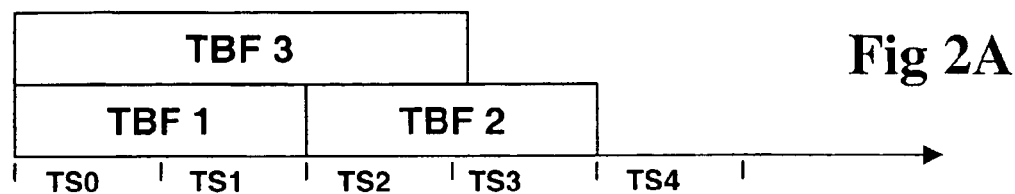
FIG. 2 shows examples of reservations of a number of users on a packet switched channels in the GPRS-network.

FIG. 2A shows the packet switched reservations for three TBFs, TBF1-3 on a PSET occupying the first four time slots TS0-3 of a TDMA-frequency. The rest of the time slots (only TS4 is shown) are used for other traffic. TBF1 has a reservation on the two first time slots TS0 and TS1. TBF2 uses time slots TS2 and TS3 while TBF3 partly covers the others by being reserved on the three time slots TS0-2. The weights for the three users are:

TBF1: W1=1
TBF2: W2=4
TBF3: W3=3

And the sum of weights is:
$\Sigma W_i = 8$

TABLE 1

| Schd. round | TS0 | TS1 | TS2 | TS3 | S1 | S2 | S3 | S4 | r1 | r2 | r3 | r4 |
|---|---|---|---|---|---|---|---|---|---|---|---|---|
| Start | — | — | — | — | 1 | 1 | 1 | — | 1/1 | 4/1 | 3/1 | |
| 1 | TBF3 | | | | | | 2 | | | | 3/2 | |
| | | TBF3 | | | | | 3 | | | | 3/3 | |
| | | | TBF2 | | | 2 | | | | | 4/2 | |
| | | | | TBF2 | | 3 | | | | | 4/3 | |
| 2 | TBF1 | | | | 2 | | | | 1/2 | | | |
| | | TBF3 | | | | | 4 | | | | 3/4 | |
| | | | TBF2 | | | 4 | | | | | 4/4 | |
| | | | | TBF2 | | 5 | | | | | 4/5 | |

Table 1 shows the first two schedulings rounds of the three TBFs. All the start values for S are 1. The maximum r-ratio decides which TBF will get the first time slot, TS0. As seen r2 is greatest (4/1), but TBF2 does not use TS0—see FIG. 2A. Second greatest is r3 (3/1) and since TBF3 uses TS0 that user gets the first time slot. S3 is increased by one and its r-value decreases (to 3/2). Now the greatest r-value still is r2 (4/1), but TBF2 neither uses TS1. Second greatest is once again r3 (3/2) and TBF3 also gets TS1. TBF2 uses TS2 and gets this time slot and also the last one, TS3, of the first scheduling round.

At the start of the next scheduling step in the second round, TBF1 has the first highest r-value (1/1) of the users of TS0 and TBF1 gets that time slot. (TBF3 has the same r-value (3/3) but in this example the user number is decisive.) After that TBF3 gets one and TBF2 two more time slots. According to table 1, eight time slots have been scheduled and TBF1 got one, TBF2 got four and TBF3 three, i.e. according to their weights, which would had been expected for a correct method. To summarise:

TBF1: 1 scheduling
TBF2: 4 schedulings
TBF3: 3 schedulings

Figure 2B:
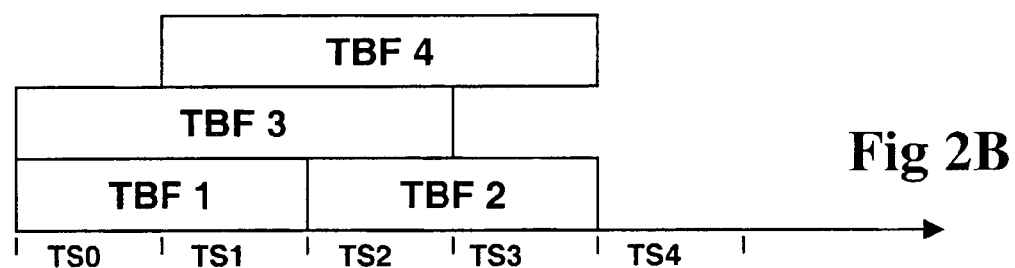

Thereafter a new user enters the scene, TBF4—see FIG. 2B. That user has a reservation consisting of TS1-3, a weight of 2 and gets a starting value $S_1$ of 11/4 (11*2/(10-2) according to the expression for $S_1$ above.

Five more schedulings are shown in table 2 together with the remaining r- and S-values from table 1 and the new values for TBF4 calculated according to the invention.

TABLE 2

| # Sch. | TS0 | TS1 | TS2 | TS3 | S1 | S2 | S3 | S4 | r1 | r2 | r3 | r4 |
|---|---|---|---|---|---|---|---|---|---|---|---|---|
| 2 | | | | | 2 | 5 | 4 | 11/4 | 1/2 | 4/5 | 3/4 | 8/11 |
| 3 | TBF3 | | | | | | 5 | | | | 3/5 | |
| | | TBF4 | | | | | | 15/4 | | | | 8/15 |
| | | | TBF2 | | | 6 | | | | | 4/6 | |
| | | | | TBF2 | | 7 | | | | | 4/7 | |

TABLE 2-continued

| # Sch. | TS0 | TS1 | TS2 | TS3 | S1 | S2 | S3 | S4 | r1 | r2 | r3 | r4 |
|---|---|---|---|---|---|---|---|---|---|---|---|---|
| 4 | TBF3 | | | | | | 6 | | | | 3/6 | |
| | | TBF4 | | | | | | 19/4 | | | | 8/19 |
| | | | TBF2 | | | 8 | | | | 4/8 | | |
| | | | | TBF2 | | 9 | | | | 4/9 | | |
| 5 | TBF1 | | | | 3 | | | | 1/3 | | | |
| | | TBF3 | | | | | 7 | | | | 3/7 | |
| | | | TBF2 | | | 10 | | | | 4/10 | | |
| | | | | TBF4 | | | | 23/4 | 0.33 | 0.40 | 0.43 | 0.35 |
| 6 | TBF3 | | | | | | 8 | | | | 0.38 | |
| | | TBF4 | | | | | | 27/4 | | | | 0.30 |
| | | | TBF2 | | | 11 | | | | 0.36 | | |
| | | | | TBF3 | | 9 | | | | 0.33 | | |
| 7 | TBF1 | | | | 4 | | | | 0.25 | | | |
| | | TBF3 | | | | | 10 | | | | 0.30 | |
| | | | TBF2 | | | 12 | | | | 0.33 | | |
| | | | | TBF2 | | 13 | | | | | | |

As seen in the two tables all the 24 scheduled radio blocks for TBF1-3 leads to a total real sum of scheduling rounds 1 to 7 of:
TBF1 =3 (3)
TBF2=12 (12)
TBF3=9 (9)

The real numbers fulfil the weights. The numbers within parenthesis represent ideal values. Even if the example shows a good result, the calculations indicate that a user like TBF2 with high QoS-value may be disfavoured if his reservation is limited to a few time slots. A conclusion is that users with high weights should get more time slots on the PSET.

The real sum of the twenty schedulings steps in rounds 3 to 7 with the new user TBF4 included is the following for each TBF:
TBF1=2 (2)
TBF2=8 (8)
TBF3=6 (6)
TBF4=4 (4)

These numbers also fulfil the weights compared to the ideal values within parenthesis.

The example according to FIG. 2 and tables 1 and 2 shows that the numbers converge to give a correct distribution of resources depending on requested QoS, the user pattern and depending on earlier scheduling.

Figure 2C:
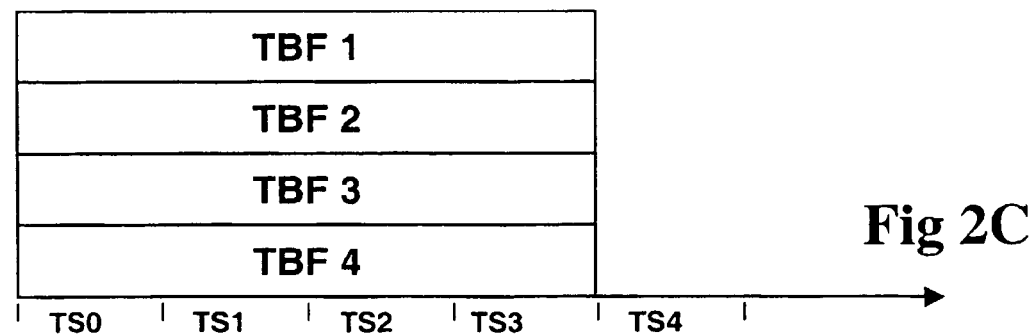

Another example is given in FIG. 2C. Here all users have the same reservations on the PSET. TBF1-3 and 5 have had an ongoing scheduling procedure for forty rounds. In table 3 the distribution of time slots among the TBFs are shown from the $41^{st}$ round. After the $46^{th}$ round the new user TBF4 is set up. According to the general expression for S1 above the starting value for S for the new user will be 33.133. The new user is shown in bold characters.

TABLE 3

| Schd. | TS0 | TS1 | TS2 | TS3 |
|---|---|---|---|---|
| 41 | TBF1 | TBF5 | TBF2 | TBF3 |
| 42 | TBF2 | TBF1 | TBF5 | TBF2 |
| 43 | TBF1 | TBF5 | TBF2 | TBF3 |
| 44 | TBF2 | TBF1 | TBF5 | TBF2 |
| 45 | TBF1 | TBF5 | TBF2 | TBF3 |
| 46 | TBF2 | TBF1 | TBF5 | TBF2 |
| 47 | TBF1 | TBF4 | TBF5 | TBF2 |
| 48 | TBF3 | TBF2 | TBF1 | TBF5 |
| 49 | TBF2 | TBF1 | TBF4 | TBF5 |
| 50 | TBF2 | TBF3 | TBF2 | TBF1 |
| 51 | TBF5 | TBF2 | TBF1 | TBF4 |

In table 4 the new values for the $47^{th}$ scheduling are shown. At least the integer part of the S-numbers exactly corresponds to the weights associated with all the users. It should be noted that the new user with a weight of 1 has almost the same value (33.133 vs. 33.300) as the existing user TBF3 having the same weight.

TABLE 4

| TBFi | Wi | Si | ri |
|---|---|---|---|
| TBF1 | 2 | 66,000 | 0,0303 |
| TBF2 | 3 | 99,500 | 0,0302 |
| TBF3 | 1 | 33,300 | 0,0300 |
| TBF4 | 1 | 33,133 | 0,0302 |
| TBF5 | 2 | 66,267 | 0,0302 |

In order to keep the comparison accurate, a rescaling of the S-values is performed from time to time. An expression to be used is Snew=Sold/constant for all S-values in the PSET.

The actual scheduling is performed on the radio interface by the transmitters, i.e. in the radio base stations and mobile stations, but under control of the PCU. Control information is sent over the A-bis interface between the BSC and the BTSs for control of the transceivers, TRXs, of the base stations and further on over the air to the mobiles when these are the objects of the scheduling scheme.

Figure 3:
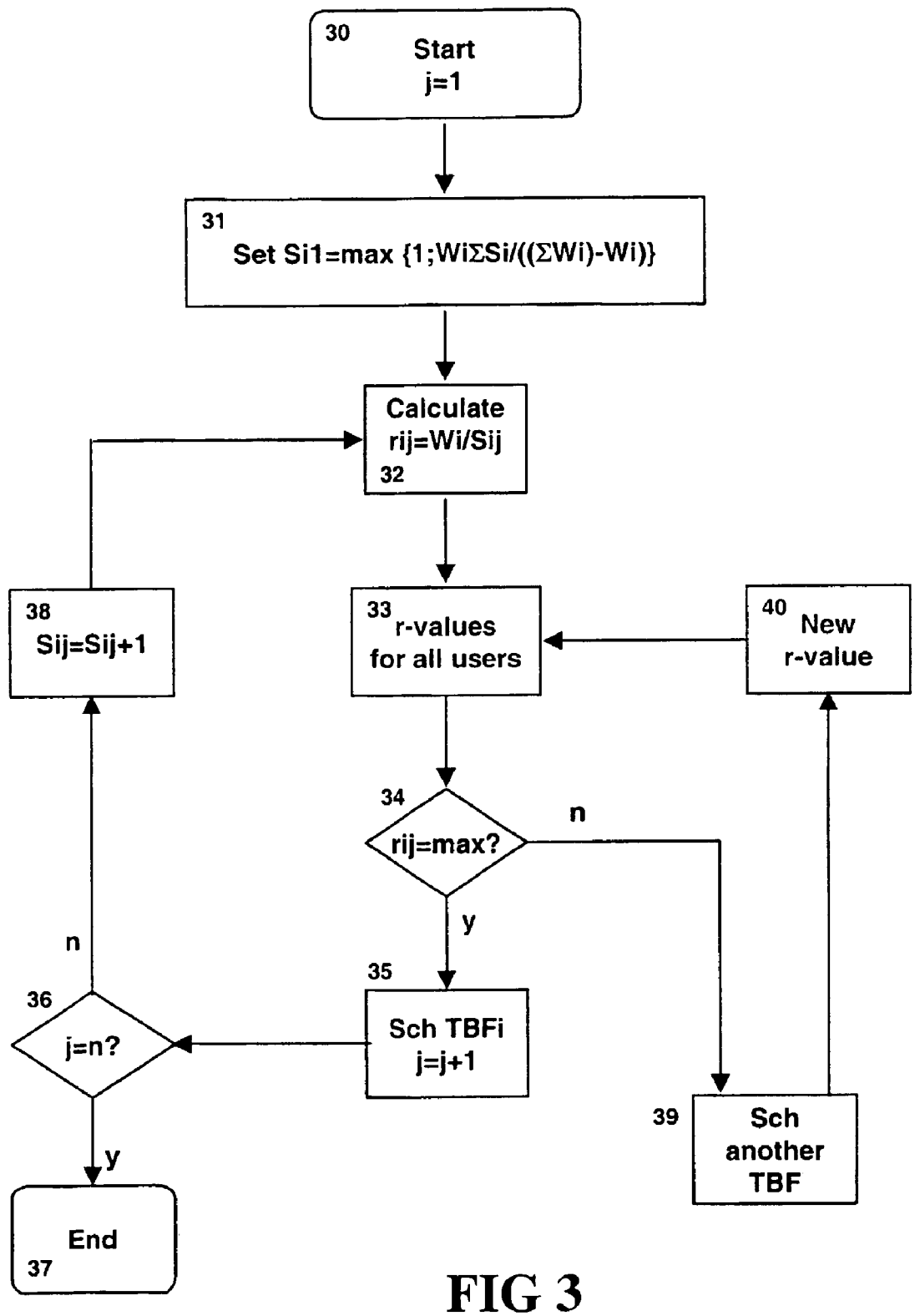
FIG. 3 is a flowchart describing one embodiment of the invention

FIG. 3 shows a flow chart for scheduling a user TBFi on its packet switched channels belonging to a PSET according to the invention. i represents the number of the user and j is a scheduling step where one radio block is scheduled for a particular user. The total number of radio blocks for the user's session is denoted n. To start with in box 30, j is set to 1 and the system prepares for scheduling the user's first radio block. The initial Sij-value (Sil for user i) is established in box 31. Thereafter the rij-relation between Sij and the weight Wi for the user is calculated in box 32. The calculated value is stored in box 33 together with r-values belonging to other users. In the conditional box 34 it is evaluated if rij has the greatest value compared to all users in the scheduling scheme. If so, TBFi is scheduled, 35, on the next set of four bursts for the packet channel time slot and j is increased by 1. Next question is if all radio blocks of TBFi has been scheduled, j=n ?, 36. A yes-answer ends the session for TBFi in box 37. If the user has more to send the S-value is increased by 1 in box 38 and a new rij is calculated in box 32. This loop is passed whenever user i is scheduled.

If user i has not got the highest r-value in the evaluating box 34 and the output is no, another user sharing the same PSET is scheduled in box 39. A new r-value, lower than the previous one for that other user is calculated in box 40. That new value replaces the old one in the storage box 33. A new question is asked in box 34 and if rij for user i is still not the maximum value another loop through the boxes 39 and 40 is passed for perhaps a third user on the PSET. If the maximal r-values are the same for several users, the numerical number of the user or some other mechanism ensuring a fair distribution of the radio resources are used.

FIG. 3 thus shows two main loops to be passed when scheduling a user in a packet switched communication system i.e.

one for the particular user i in question (to the left in the figure), one for other users sharing the same PSET (to the right in the figure).

By using this schedulings and the special parameters according to the invention it is ensured that the radio resources are distributed in a fair way among the users.

Final Comments

The invention relates to scheduling of several users in a packet switched radio communication network. The idea of the invention is to calculate a scheduling number for each user before each scheduling event. The number is related to the QoS requested by the particular user and earlier schedulings. The relation is decisive of which user to be scheduled in the next event.

The chosen algorithm for the scheduling according to the preferred embodiments above should rather be regarded as examples for realising the idea of the invention. It is possible to use other start values and calculations along the way. For example it would be possible to use real scheduling numbers for at least the original users, start on zero and use another expression for the r-relation. A new user will, however, have to use a higher start value matching the users already in scheduling sessions, thus denoting at least the new users scheduling number a "virtual" dito.

The invention has been described mainly in relation to GSM and its related packet switched system GPRS. However, the skilled man immediately realises, that the idea of the invention is applicable as soon there are several users sharing the same radio resources and where there are good reasons to distribute the resources as evenly and fair as possible, especially over a time divisional radio interface with a dynamic behaviour among the users.

The invention claimed is:

1. A method of scheduling radio resources for a user in a plurality of users in a telecommunication packet-switched system, each of the users having an associated Quality of Service (QoS), said method comprising the steps of:
   calculating a scheduling number (Si) based on earlier schedulings for each of the users before each new scheduling;
   allocating a weight ($W_i$) in the scheduling process to each user based on each user's associated QoS;
   creating a relationship (r) between the weight ($W_i$) and the scheduling number (Si), said relationship being decisive of which user is to be scheduled, wherein the relationship is the ratio ($W_i$/Si) between the weight and the scheduling number;
   observing the scheduled user's dynamic behavior; and
   scheduling radio resources for the scheduled user based on at least the following parameters:
      the allocated weight ($W_i$) of the scheduled user compared to the weights of other users;
      earlier schedulings of radio resources; and
      the dynamic behavior of the scheduled user.

2. The method of claim 1, wherein the step of scheduling radio resources for the user includes scheduling transmission of a radio block for the user if the ratio $W_i$/Si for the user is larger than the ratio for any other user.

3. A method of scheduling radio resources for a user in a plurality of users in a telecommunication packet-switched system, each of the users having an associated Quality of Service (QoS), said method comprising the steps of:
   calculating a scheduling number (Si) based on earlier schedulings for each of the users before each new scheduling, wherein the scheduling number for a user is increased by 1 as soon as the user has been scheduled;
   allocating a weight ($W_i$) in the scheduling process to each user based on each user's associated QoS;
   creating a relationship (r) between the weight ($W_i$) and the scheduling number (Si), said relationship being decisive of which user is to be scheduled;
   observing the scheduled user's dynamic behavior; and
   scheduling radio resources for the scheduled user based at least on the following parameters:
      the allocated weight ($W_i$) of the scheduled user compared to the weights of other users;
      earlier schedulings of radio resources; and
      the dynamic behavior of the scheduled user.

4. A system for performing scheduling of a number of users sharing the same communication channels in a packet-switched radio communication system during a scheduling session, said system comprising:
   means for calculating a scheduling number (Si) for each user dependent on earlier schedulings for the user and other users;
   means for calculating a weight ($W_i$) associated with a Quality of Service assigned to each user; and
   means for taking into account different users entering or leaving the scheduling session in order to ensure a fair distribution of radio resources among the different users according to their assigned weights independent of when each user enters the scheduling session;
   wherein the scheduling number (Si) is initially set to a value of 1 for users participating in the session from the start, while users entering the session later get either 1 or $W_i \cdot \Sigma Si/((\Sigma W_i) - W_i)$, whichever is larger, as their initial scheduling number, where
   $W_i$ is the weight assigned to the user,
   $\Sigma W_i$ is the sum of weights for all users, and
   $\Sigma Si$ is the sum of scheduling numbers for earlier users.

5. The system of claim 4 wherein each user has a reservation on a number of packet-switched channels.

6. A method of scheduling radio resources for a user in a plurality of users in a telecommunication packet-switched system, each of the users having an associated Quality of Service (QoS), said method comprising the steps of:
   calculating a scheduling number (Si) based on earlier schedulings for each of the users before each new scheduling;
   allocating a weight ($W_i$) in the scheduling process to each user based on each user's associated QoS;
   creating a relationship (r) between the weight ($W_i$) and the scheduling number (Si), said relationship being decisive of which user is to be scheduled;
   observing the scheduled user's dynamic behavior; and scheduling radio resources for the scheduled user based at least on the following parameters:
- the allocated weight ($W_i$) of the scheduled user compared to the weights of other users;
- earlier schedulings of radio resources; and
- the dynamic behavior of the scheduled user;

wherein the step of calculating a scheduling number includes the steps of:
- when the scheduling process begins, assigning each user being scheduled, a scheduling number with a starting value of 1; and
- for new users entering the scheduling process once it has started, calculating the scheduling number as a function of earlier scheduling numbers (Si) and the weights ($W_i$) of all users by calculating the starting scheduling number for a user entering the scheduling process once it has started using the equation, $W_i \cdot \Sigma Si/((\Sigma W_i)-W_i)$, if the equation yields a value greater than 1; and assigning a scheduling number with a starting value of 1 to the user entering the scheduling process once it has started, if the equation yields a value that is not greater than 1.

7. The method of claim 6, further comprising the steps of:
establishing a Temporary Block Flow (TBF) for data to be sent by each user;
dividing the TBF into radio blocks; and
sending one radio block over the radio interface when the user is scheduled.

8. A system for performing scheduling of a number of users sharing the same communication channels in a packet-switched radio communication system during a scheduling session, said system comprising:
- means for calculating a scheduling number (Si) for each user dependent on earlier schedulings for the user and other users;
- means for calculating a weight ($W_i$) associated with a Quality of Service assigned to each user;
- means for calculating a ratio ($W_i$/Si) between the weight and the scheduling number for each user;
- means for scheduling transmission of a radio block for a given user if the ratio $W_i$/Si for the given user is larger than the ratio for any other user; and
- means for taking into account different users entering or leaving the scheduling session in order to ensure a fair distribution of radio resources among the different users according to their assigned weights independent of when each user enters the scheduling session.

* * * * *

UNITED STATES PATENT AND TRADEMARK OFFICE
CERTIFICATE OF CORRECTION

| | | |
|---|---|---|
| PATENT NO. | : 7,474,649 B2 | Page 1 of 1 |
| APPLICATION NO. | : 10/506846 | |
| DATED | : January 6, 2009 | |
| INVENTOR(S) | : Eriksson et al. | |

It is certified that error appears in the above-identified patent and that said Letters Patent is hereby corrected as shown below:

On the Title Page, item (75), under "Inventors", in Column 1, Line 1, delete "Sundbyborg" and insert -- Vallentuna --, therefor.

Signed and Sealed this

Second Day of June, 2009

JOHN DOLL
*Acting Director of the United States Patent and Trademark Office*